United States Patent [19]

Van der Loon et al.

[11] Patent Number: 4,566,349

[45] Date of Patent: Jan. 28, 1986

[54] CHATTERLESS SHIFTER

[75] Inventors: Dwain Van der Loon, Wyoming; Gary Curths, Grandville, both of Mich.

[73] Assignee: Alofs Manufacturing Company, Grand Rapids, Mich.

[21] Appl. No.: 539,697

[22] Filed: Oct. 6, 1983

[51] Int. Cl.$^4$ ................ B60K 20/02; B60K 20/00
[52] U.S. Cl. .................................. 74/475; 74/527
[58] Field of Search ...................... 74/527, 473, 475

[56] References Cited

U.S. PATENT DOCUMENTS

| | | | |
|---|---|---|---|
| 3,241,640 | 3/1966 | McCordic et al. | 74/475 |
| 3,418,867 | 12/1968 | Maeda | 74/473 |
| 3,899,934 | 8/1975 | Froumajou | 74/473 |
| 3,902,378 | 9/1975 | Osborn | 74/475 |
| 3,994,184 | 11/1976 | Osborn | 74/475 |
| 4,245,521 | 1/1981 | Osborn | 74/473 |
| 4,282,768 | 8/1981 | Osborn | 74/473 |
| 4,355,543 | 10/1982 | Ikomoto | 74/473 |
| 4,370,897 | 1/1983 | Carlo | 74/473 |

Primary Examiner—William L. Freeh
Attorney, Agent, or Firm—Miller, Morriss & Pappas

[57] ABSTRACT

A chatterless shifter structure having an index selector plate, a shifter bracket and a shifter extension of stamped metal. The shifter bracket and shifter extension nest together and are fabricated to act together as a single lever element rockable out of the plane of arcuate movement to selectively free a tab for selective engagement with the index plate. The pivot is cushioned and insulated against vibration and sound.

4 Claims, 4 Drawing Figures

CHATTERLESS SHIFTER

The present invention relates to a new and improved chatterless shifter and more specifically to a gear shifting structure which absorbs the shock and vibrations from a connected apparatus such as a transmission housing or gear train housing in vehicles. Still more specifically, the present invention seeks to replace heretofore machined structures with a combination of stamped metal parts selectively hardened and stiffened to cooperate with the directed transmission, to provide decorative interfacing with the vehicle interior, and to integrate the parts required to suppress the sounds, vibrations, and chatter normally present in shifter structures in automotive equipment.

In part, the vibrations are sympathetic to mechanical movement buttressed and amplified by body and frame suspension with vehicle movement. Especially in trucks, vans, and panel wagons, the vibration problem is acute. In many such vehicles the shifters shake or vibrate in such a violent manner as to be tactually and audibly offensive to the users. In some instances the vibrations create noise against adjacent body parts. In other instances the chatter creates fatigue, wear, damage and ultimate failure in conventional parts.

The present invention is believed to substantially eliminate the indicated difficulties by providing a sturdier and less expensive structure while maintaining excellent repetitive accuracy at no diminution of quality and with desirable good appearance and "feel" within the vehicle.

Accordingly, the principal object is to provide a shifter structure which is relatively free from vibration transmission problems.

Another object is to provide a stamped metal shifter structure where the stamped parts are non-destructive of decor considerations with attendant cost reduction.

Still other objects are to be appreciated as the description proceeds and this includes increased resistance to fatigue and wear in automotive, truck, van and light truck uses.

THE PRIOR ART

The prior art which this invention replaces includes many machined and die cast composite structures of relatively complex design compared to the present invention.

GENERAL DESCRIPTION

In general, the chatterless gear shifter of the present invention includes three metal stampings: an index or selector plate; a movable shifter bracket; and a shifter extension element. The shifter bracket and the shifter extension together comprise a lever-like shifter assembly. The latter extension element nests in the formed portion of the shifter bracket and the extension element is limitedly rockable in a plane substantially normal to the principal plane of movement of the shifter bracket so as to permit disengagement of an integral tab of the extension from the index or selector plate slots or notches and still pivotally control the movement of the shifter bracket on its pivotal axis. The shifter bracket is pivotally connected to the index plate and nestably receives the shifter extension. The nesting is achieved by vertical edge flanges in both parts which generally parallel the longitudinal orientation of shifter bracket and shifter extension. The pivotal connection in respect to index plate is by means of a buffered insulating bushing comprising a swaged tube secured as by the swaging and welding through the shifter bracket thereby enclosing a confined tubular and resilient rubber-like bushing on an internal sleeve bearing and through which bearing a stud is passed. The headed stud extends from the index plate, passes axially through the bushing in a journalled relation to the sleeve bearing. The outer tube is swaged on each side of the bracket plate and fixed, as by welding, to the bracket plate. The stud extends through the pivot opening of the index plate a distance to threadably secure the index plate to a fastening boss of the transmission housing. A slotted opening adjacent the principal opening through the index plate adjustably locates the index plate on an arc of a radius through the principal opening and which arc is generally concentric with the upper arcuate notched surface of the index plate. The lower end of the shifter bracket is offset and provided with lever connecting means whereby the selected movement of the shifter bracket is remotely translated to move and to thereby select transmission options as established by moving the shifter extension and the shift bracket through a selected arc.

A resilient mat is provided intermediate the nesting shifter extension and shifter bracket. This cushions and relieves the adjacent parts from noise, wear, shock and chatter generation. A spring loaded stop pin urges the shifter extension against the shifter bracket and a lower aligned pin locates and guides the lower end of the shifter extension in prevention of removal of the shifter extension from the shifter bracket while permitting necessary relative tilting displacement for disengagement of the tab from the index or selector plate.

Suitable decorative handle and a bushing for a boot cover are very simply attached to the upper terminal end of the shifter extension and intermediate the handle and integral tab, respectively. These are made of cushion material having good vibration insulating properties such as rubber or neoprene and the like. The handle may be decoratively covered by leather or simulated leather and attached by threads machined in the upper terminal end of the shifter extension enlarged as by the weldment thereto of a thickened portion or by folding and rolling the extension element at the handle end.

The nesting of shifter extension to shifter bracket is achieved by vertical flanging of the edges of both elements normal to the principal planes thereof so that the two pieces function in the plane of rotation through the arc of movement as one piece and the outward tilt clears the tab of the index plate apertures for another gear selection. In cross section the nesting resembles nested channel portions.

The shifter structure functions quietly and is self absorptive of vibrations from the adjacent transmission case, vehicle and engine or power trains. Offensive tactile and audible feelings are substantially eliminated. The stampings provide selected strength and lighter weight than in castings and machined parts. The stampings are steel and selected or treated for specific harness as required in use. The units are economically fabricated with an accuracy that is repetitive and rapid using conventional and accepted metal stamping procedures.

In the Drawings

FIG. 1 is a side elevation view of the shifter structure of the present invention.

FIG. 2 is a front elevation view of the shifter structure of FIG. 1 and partially cut away to indicate the spring bias urging the shifter extension into nesting engagement with the shifter bracket and in phantom line indicating the tilt-out of the handle for disengagement of the tab and selection of gears and indicating also that the shifter bracket is connected to a transmission case or other adjacent structure shown in phantom line and through the index or selector plate.

SPECIFIC DESCRIPTION

Figure 1:
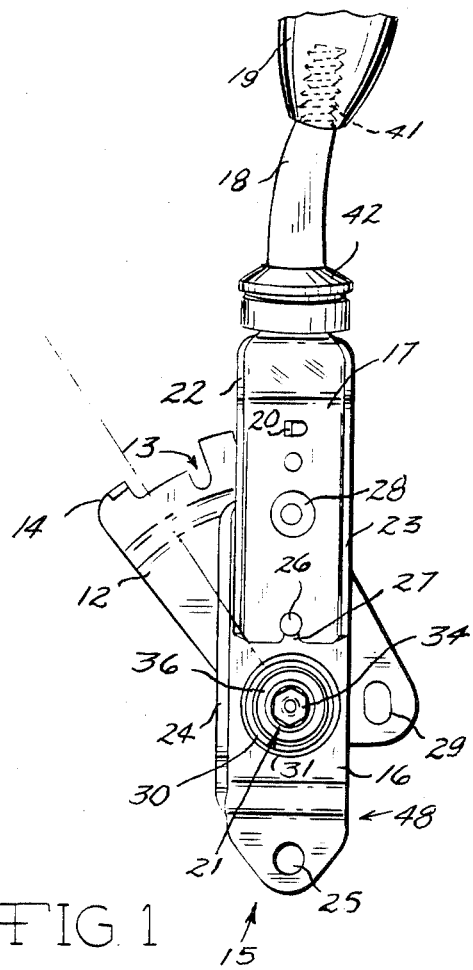

Referring to the drawings and with first reference to the FIG. 1 thereof, the chatterless shifter 11 of the present invention is shown as it would be viewed when connected in a vehicle and with the decorative and protective boot or cover removed therefrom. The index or selector plate 12 will be appreciated as fastened to a transmission or gear case housing and the notches 13 in the upper arcuate edge 14 are positioned to provide selective stops for the arcuate selective movement of the shifter assembly 15 comprising the movable shifter bracket 16 and the shifter extension element 17. On the upper end of the shifter extension element 17 there is included an integral handle or stem portion 18 and the portion 18 is topped by the removable operating handle 19. The shifter extension 17 includes a tab 20 located in registry with the arcuately presented notches 13. The tab 20 is movable to selected notches 13 and is the means for selecting the amount of movement of the shifter assembly 15 on the principal pivot 21, for selection of desired operation transmission ranges.

The shifter bracket 16 nestably retains the shifter extension 17 in a longitudinally aligned manner and the nesting is facilitated by the edge flanges 22 and 23 of the shifter extension 17 which, as will be seen, embraces the similarly flanged edge 24 of the shifting bracket 16. The flanges 22, 23 and 24 are normal to the principal plane of the shifter extension 17 and shifter bracket 16, respectively. Aside from stabilization, the flanges impart substantial rigidity and strength to the shifter elements 16 and 17. The lower end of the shifter bracket 16 is offset and includes a connector opening 25 so that the lower portion of the bracket 16 serves as a lever moving connecting linkage (not shown) as the shifter assembly 15 is moved on the principal pivot 21. The shifter bracket 16 includes a locating pin 26 which fits into a bayonet slot 27 at the lower end of the shifter extension 17.

Figure 2:
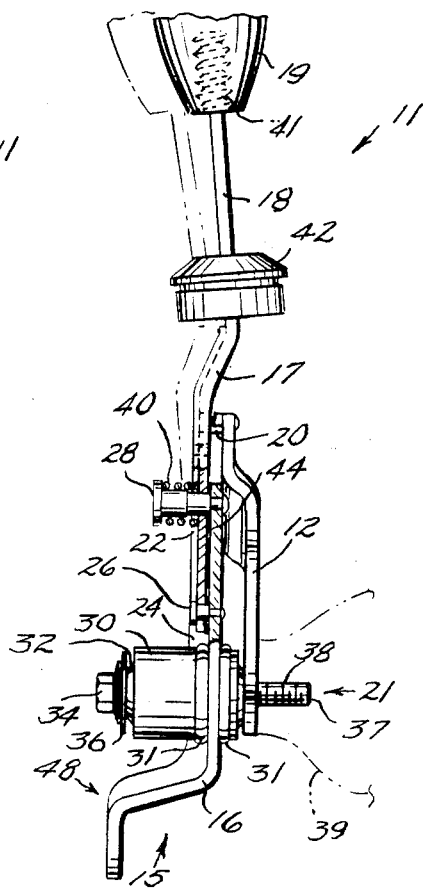

In line with the pin 26 and the principal pivot 21, is a headed spring retainer 28 which is secured to the shifter bracket 16, extends through the shifter extension 17 and resilient means urging the shifter extension 17 into nesting contact with the bracket 16, as will be better appreciated in the FIG. 2.

The index plate 12 includes a slotted opening 29 adjacent the lower portion thereof and through which an adjusting bolt may be passed to fix the index plate 12 in an adjusted position against, for example, a transmission housing.

The principal pivot 21 is achieved by an insulating bushing 30 which forms an outer tubular encasement which is swaged firmly into the principal opening in the shifter bracket 16 and is welded thereto at the swaged portions 31. The insulating bushing 30 contains a cylindrical resilient tube 32 of rubber or rubber-like material having good mechanical properties and good memory characteristics. An inner tubular sleeve bearing 33 lines the resilient tube 32. This, as will be seen, journals the headed stud 34 and the stud 34 includes an axial opening 35 whereby lubricant can be inserted axially through the stud 34 and radially to the journal interface. A thrust washer 36 bears on the sleeve bearing 33. The projecting end 37 of the stud 34 is threaded and the threads 38 provide attachment means which pass through the index plate 16 and into an adjacent structure such as the transmission housing 39 shown in phantom line in FIG. 2.

Referring now to the FIG. 2, the headed spring retainer 28 is best understood as bearing on the spring 40 which is under compression against the shifter extension 17 thereby urging a resilient contact as between the shifter extension 17 and the shifter bracket 16. Thus nested between flange 24 against the flange 22, the shifter extension 17 is also pinned by the locator pin 26 in the slot 27 against chance displacement vertically. However, enough clearance is provided between locator pin 26 and slot 27 to permit the rocking or tilting of the shifter extension 17 on the pin 26 as indicated in phantom line for a sufficient movement allowing the tab 20 to be withdrawn from notches 13 so that a new position of the shifter extension 17 is thus available as the extension moves through the arc of travel limited only by stops in prevention of overrun of the index plate 12. The shifter bracket 16 and the shifter extension 17 are thus seen to move together through the arc required to select a particular transmission setting and in that arcuate movement pivoting occurs on the pivot 21 established by the insulated bushing 30 on the stud 34. Such arcuate movement cannot occur until the tab 20 is cleared from the notches 13 and such clearing is by leaning, tilting or rocking the shifter extension 17 as shown in the FIG. 2.

In the FIGS. 1 and 2, the decorative and padded handle 19 is threaded onto the mating threaded upper projection 41 of the shifter extension 17. The threads 41 are applied over a thickened portion of the stem 18 as by building up the terminal end of the stem by a weld bead, or by folding, crimping and rolling the stem 18 at its terminal end and thereafter threading the end of the stem 18 as shown. Between the shifter bracket 16 and shifter extension 17 is a mat 44 of rubber-like cushioning materials.

Figure 3:
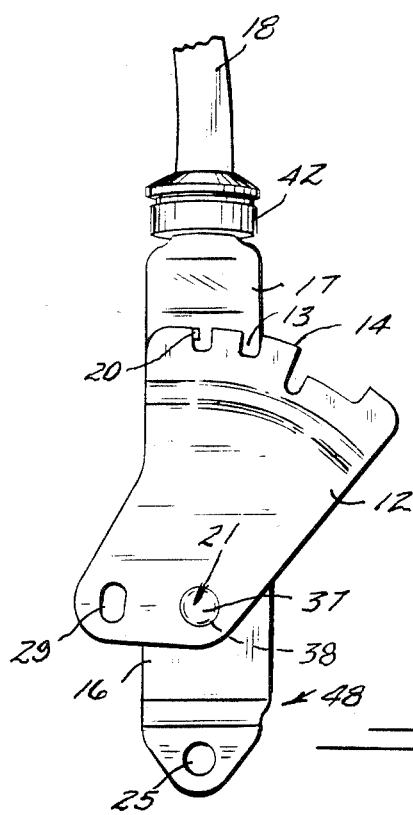
FIG. 3 is an opposite side elevation view of the shifter shown in FIG. 1 and best indicating the index or selector plate as secured to the transmission case.

The FIG. 3 provides a better comprehension of the index or selector tab 20 and the threaded protruding end 37 of the stud 34 which forms the pivot 21 is visible. The offset in the lower end of the shifter bracket 16 is appreciated and the shape of the offset is also appreciated in the FIG. 2.

In the FIGS. 1-3, inclusive, the conical topped cylindrical boot retainer 42, having a perimeter groove 43 and made from a neoprene or rubber-like material, is seen forced down over the steering portion 18 of the shifter extension 17 so as to carry a protective boot skirt (not shown) which shrouds or covers the exposure of the assembly 15 and is connected to the interior floor of the vehicle. The assembly 15 projects into the vehicle. The boot is not shown but will vary in color, shape, and extension to clinch in the ring groove 43 of the boot retainer 42. An axial aperture allows the boot retainer 42 to be pressed over the stem 18.

The projecting tab 20 is seen in one of the notches 13.

Figure 4:
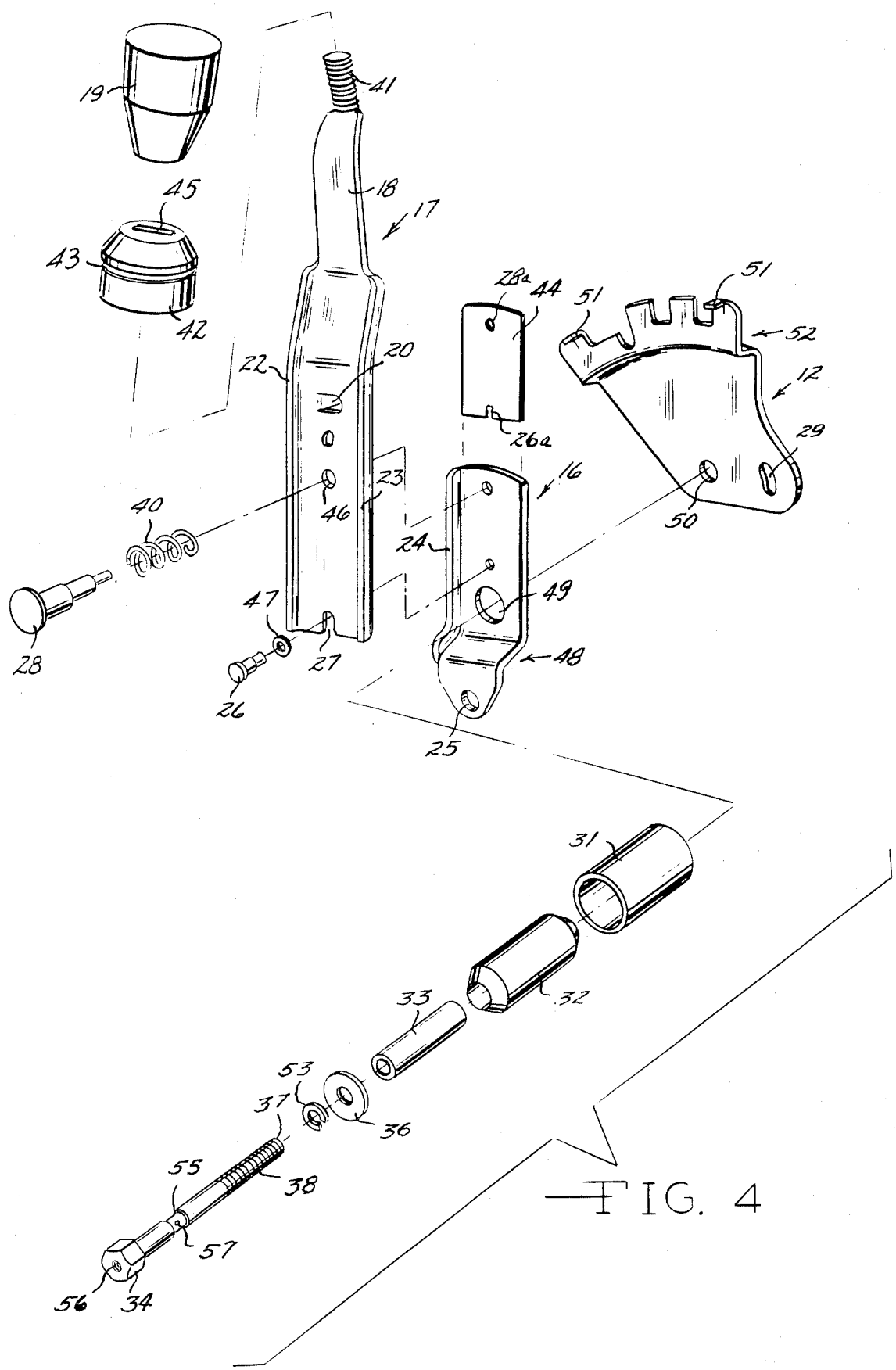
FIG. 4 is an exploded and somewhat schematic view of the entire shifter structure of the present invention and indicating by disassembly the structural simplicity of the construction.

By reference to the FIG. 4, the visualization of the construction of the chatterless shifter 11 in relation to the fabrication of the individual parts and their interrelationship to each other is facilitated.

The handle or knob 19 is threadably attached to the threaded projection 41 at the upper end of the stem 18 of the shifter extension 17 after the boot retainer 42 has been pressed over the threaded part 41 and down the stem 18 via the aperture 45 in the conical headed boot retainer 42. The connection is facilitated by the slight taper seen in the stem 18. At least one vertical edge of the shifter extension 17 is provided with a flange, as the flanges 22 and 23, facilitating nesting of the shifter extension in the shifter bracket 16 and its similar upstanding edge flange as 24. The tab 20 is lanced and bent outwardly from the principal plane of the stamping and the pierced clearance opening 46 and longitudinally aligned slot 27 receives, respectively, the spring retainer 28, spring 40 and the locator pin 26 with the resilient compression annulus 47. By reference to FIG. 2 the headed spring retainer 28 extends through the shifter extension 17 and through the shifter bracket 16 in the manner of a rivet (as best seen in FIG. 2). Similarly, the locator pin 26 is firmly riveted to the shifter bracket 16. The shoulders on the elements 28 and 26 establish the correct clearance relation to accommodate the rocking motion and nesting as described elsewhere. Between the shifter extension 17 and the shifter bracket 16 is a mat 44 of resilient cushion-like insulating material and the pins 28 and 26 secure the mat 44 through the corresponding openings 28a and 26a. The shifter bracket 16 is offset at its lower end and the connector opening 25 is in the outer plane of the offset portion 48. The principal opening 49 through the web portion of shifter bracket 16 is in axial register with the pivot 21 (previously described) and receives the tubular element 30 which, at assembly to the bracket 16, is swaged in place and welded thereto. FIG. 2 best indicates the final swaged form of the tubular element 34. The pivot 21 is in axial register with the pivot opening 50 in the index plate 12 as will be appreciated. The uper edge 14 of the index plate 12 is arcuate and notches 13 are selectively positioned to permit a variety of selection by the impingement of the tab 20. Overrun stops 51 are visible limiting the total arcuate movement of the shifter assembly 15. The arcuate offset 52 places the notches 13 in normal locked proximity to the tab 20. The slot opening 29 permits adjustment of the relatively fixed position of the index plate 12 in respect to the transmission case or housing 39.

The outer tubular swaged sleeve 31 is shown in straight tubular relation and after insertion into the opening 49 it is swaged in place (as seen in FIGS. 1, 2 and 3) and the rubber-like tube 32 with its slightly conical ends is axially inserted therein. The sleeve bearing 33 is axially pressed into the axial bore of the rubber-like tube 32 and is substantially the total length of the rubber-like tube 32. A thrust washer 36 is coaxially oriented with the bearing 33 and compression lock washer 53 is positioned to receive compressive stresses from the head portion of the headed stud 34 and thrusts against the washer 36. The stud 34 has a smooth shanked journal portion 54 with a lubrication groove 55 which is in radial flow communication with an axial orifice 56 through the head of the stud 34. The radial passage 57 establishes the communication. This permits lubrication of the journal and the axial opening 56 is preferably threaded to permit selected plugging.

The principal parts 12, 16, and 17 are made from metal stampings, preferably steel. The elements 42, 44, 47 and 32 are fabricated from rubber or rubber-like materials such as neoprene to provide resiliency, insulation, strength, rigidity, mechanical stability, shock absorption and good memory. The construction admits of tasteful and conventional decoration within an automotive vehicle and suitably booted in colors or style to suit.

Having thus described our invention and the preferred embodiment thereof, those skilled in the art will perceive improvements, changes and modifications within the skill of the art and such improvements, changes and modifications are intended to be included herein limited only by the scope of our hereinafter appended claims.

We claim:

1. A chatterless shifter combination comprising:
    a stamped metal index plate having arcuately disposed notches on the upper edge thereof and stop means for each;
    a stamped metal shifter bracket pivotally connected to said index plate by means of a tubular swage-connected buffered insulating bushing and stud attached to said shifter bracket;
    a stamped metal shifter extension having a tab extension to operably engage said index plate and nestable in said shifter bracket and limitedly tiltable against said shifter bracket;
    an insulating mat between said shifter bracket and said shifter extension; and
    means urging said shifter extension into nesting contact in said shifter bracket and into normal selected engagement of said tab with said index plate.

2. In the combination of claim 1 wherein said buffered insulating bushing includes an outer swaged tubular housing welded to said shifter bracket;
    an intermediate resilient tubular cushion bearing on said outer tubular housing at the inner surface thereof;
    a tubular inner sleeve bearing on said resilient cushion; and
    a stud in journal relation axially through said sleeve bearing and having a threaded end projecting through said index plate for connection to adjacent housing.

3. A chatterless shifter for vibration dampened connection to adjacent apparatus comprising:
    a stamped metal index plate having a plurality of arcuately disposed notches on the upper edge thereof and including an offset strengthening plane, said index plate having a principal opening therethrough on the radius of said arcuately disposed notches and an adjusting slot on a radius through said principal opening and offset from said principal opening;
    a stamped elongate metal shifter bracket with at least one raised edge flange rising normally from the principal plane of said shifter bracket connected pivotally to said index plate by means of a buffered insulating bushing and the outer tubular sleeve of said bushing being swaged and welded to said shifter bracket in axial register with said principal opening through said index plate and said bushing having a tubular inner sleeve and a tubular resilient and sound insulating mat element tightly intermediate said outer and inner sleeves, said inner sleeve forming journal means for operating engagement with a smooth surface of a stud axially through said bushing, said stud having a threaded end for attachment to adjacent housing structure, said shifter bracket including a lower integral offset portion with an opening therethrough for connection to remote shift means;

an elongate stamped metal shifter extension having vertical raised flange edges nestably engaged along a substantial portion of the length thereof with said shifter bracket against the flanges thereof and tiltably connected for limited movement at the upper end while retained by said shifter bracket and said shifter extension including a projecting integral tab in operative registry with said notches in said index plate;

an insulating mat between said shifter bracket and said shifter extension;

means urging said shifter extension into nesting contact with said shifter bracket and urging said tab toward stop engagement with selected of said notches of said shifter bracket; and separate locating means through said shifter bracket and said shifter extension in prevention of full separation between said shifter bracket and said shifter extension.

4. In the combination of claim 3 wherein said stud is headed and wherein an axial orifice through the head and radial internal connecting orifices provide lubricating channels to said journals.

* * * * *